Aug. 28, 1928.

Re. 17,071

F. B. McKUNE

OPEN HEARTH FURNACE

Original Filed Oct. 27, 1919 3 Sheets-Sheet 1

Witness:

Geo. C. Duncan

Inventor

Frank B. McKune

By Wilkinson, Huxley, Byron & Knight

Attys

Aug. 28, 1928.

Re. 17,071

F. B. McKUNE

OPEN HEARTH FURNACE

Original Filed Oct. 27, 1919 3 Sheets-Sheet 2

Witness:
Fred C. Dawson

Inventor
Frank B. McKune
By Wilkinson Huxley Byers & Knight
Attys

Aug. 28, 1928.

Re. 17,071

F. B. McKUNE

OPEN HEARTH FURNACE

Original Filed Oct. 27, 1919 3 Sheets-Sheet 3

Witness:
R. C. Duncan

Inventor
Frank B. McKune
By Wilkinson, Huxley, Byron & Knight
Attys

Reissued Aug. 28, 1928. Re. 17,071

UNITED STATES PATENT OFFICE.

FRANK B. McKUNE, OF HAMILTON, ONTARIO, CANADA, ASSIGNOR, BY MESNE ASSIGNMENTS, TO OPEN HEARTH COMBUSTION COMPANY, OF CHICAGO, ILLINOIS, A CORPORATION OF DELAWARE.

OPEN-HEARTH FURNACE.

Original No. 1,339,855, dated May 11, 1920, Serial No. 333,756, filed October 27, 1919. Reissue No. 16,837, dated December 27, 1927, Serial No. 558,754, filed May 5, 1922. This application for reissue filed July 2, 1928. Serial No. 290,058.

This invention, which relates generally to improvements in open hearth furnaces, more particularly has for its object to provide certain improved structural arrangements in furnaces of the character referred to, especially adapted for the economical burning of gases, a more uniform distribution thereof and for lengthening the life of the furnace and the checker work that constitutes a part thereof.

Another and essential object of my invention is to provide in an open hearth furnace, certain improved features adapted for increasing the rapid melting of the heat and which give absolute control of the flame in such furnace, with a material productive increase over the method generally utilized for heating metal in open hearth furnaces by means of the combustion of gases.

With other objects in view, my invention, in its subordinate features, embodies certain improvements in the damper rigging that controls the air induction and eduction and in such manner that little or no gas is lost, when reversing the furnace, and very little dirt carried down through the regenerators, due to a perfect combustion of the gases.

In setting forth the improved details of construction of my open hearth furnace, the purpose of my invention will be best understood by referring to the accompanying drawings which illustrate a preferred form of my invention, it being premised, however, that various changes in the details or modifications of the cooperative arrangement of the parts shown may be readily made without departing from the spirit and the scope of my invention as defined in the appended claims.

In the drawings—

Figure 3 is a partly vertical section and partly end elevation of the furnace and the damper rigging mechanism, hereinafter specifically referred to;

Figure 1:
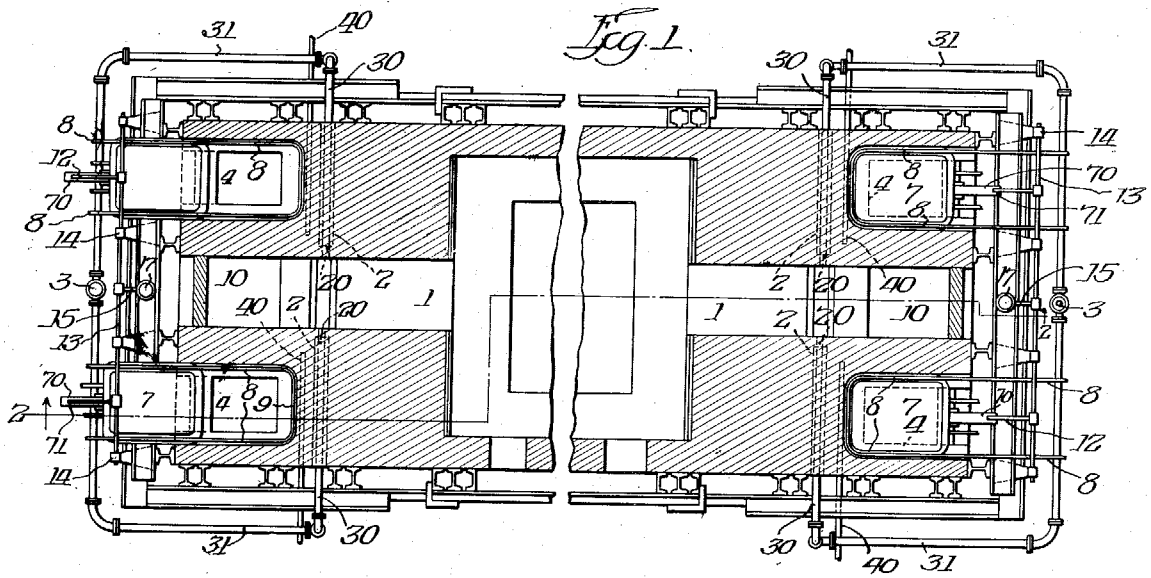
Figure 1 is a horizontal section of an open hearth furnace embodying my invention, the damper operating mechanism at both ends being shown in plan view, the damper at one end (the inlet) being shown as wholly closed and the damper at the other end (the outlet) being shown as wholly opened.
Figure 5:
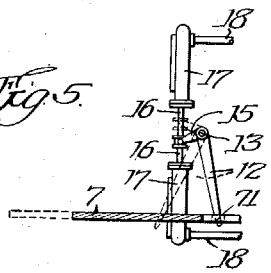
Figure 5 is a detail sectional view of one of the control valves or dampers, and the hydraulic cylinders and lever connections cooperatively joined therewith, the latter being in side elevation.
Figure 2:
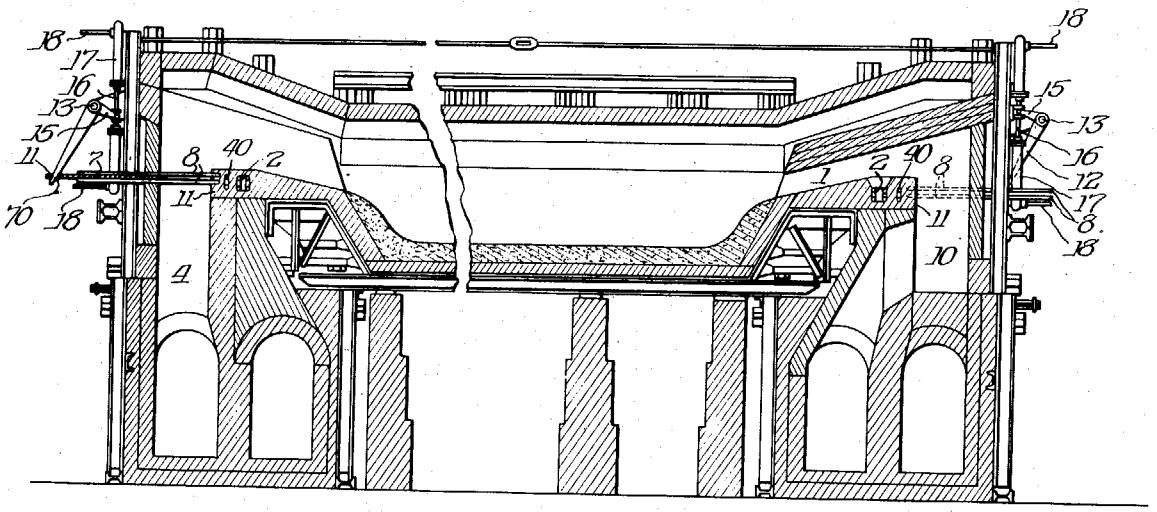
Figure 2 is a vertical longitudinal section thereof, on the line 2—2 of Figure 1.
Figure 3:
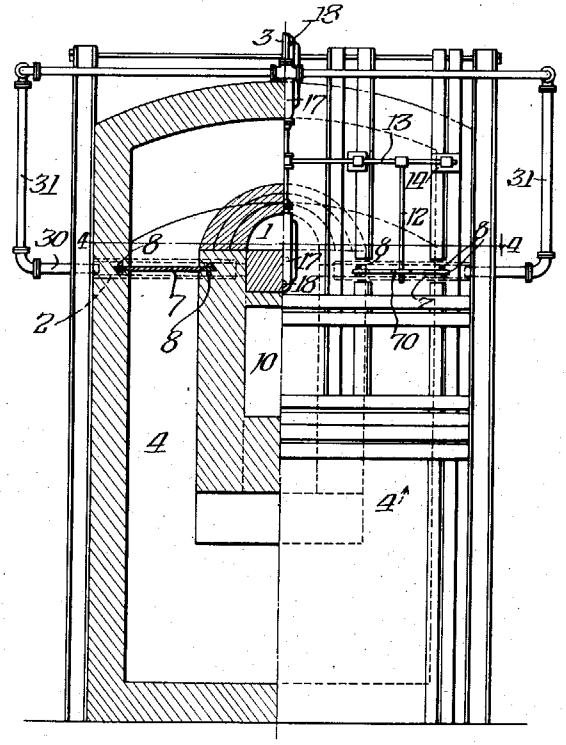

In the drawings, I have illustrated a conventional form of open hearth furnace in which is embodied my invention and in the showing thereof, see particularly Figures 1 and 2, 1—1 designate the usual wet or dry ports, one at each end, into which the gases are delivered in any suitable manner, preferably by gas tunnels 2—2, which extend transversely into the opposite sides of the furnace walls and which communicate through the jet outlets 20—20, with the gas ports 1—1 and which connect, at their outer ends, with the supply branches 30—30 that join with the main laterals or gas pipes 31—31, which in turn, connect with the main supply pipes 3 in the manner clearly shown in Figures 1 and 3 of the drawings.

The gas ports 1—1, before referred to, communicate with the main air passages 10—10 and, when the supplemental air passages 4—4, presently again referred to, are closed, the entire air can be put through the inlet port 1 and such air can be either forced or natural air.

Figure 4:
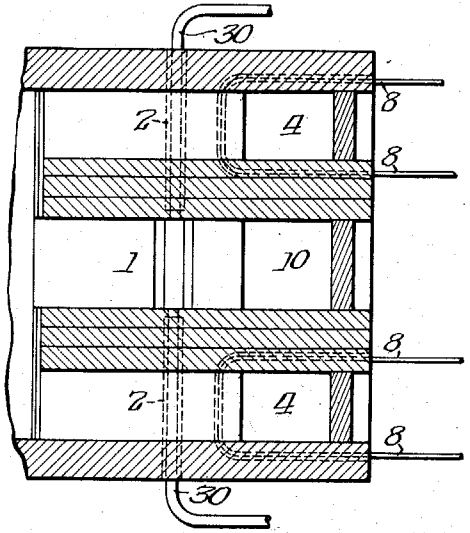
Figure 4 is a horizontal section of one end of the furnace taken substantially on the line 4—4 on Figure 3.

By referring now more particularly to Figures 1 and 4, it will be observed that a supplemental air passage 4—4 is located at each side of the gas ports 1—1 and their air passages 10—10, it being understood that the arrangement of the gas, the main air ports, the supplemental air ports, and the control mechanism, presently explained, are alike, so that, when reversing the ports at one end, serve as inlets and the ports at the opposite ends as the outlets and vice versa.

In the complete assemblage of the parts, comprised in my construction of open hearth furnace, is included hydraulic damper rigging devices, which, per se, constitute an essential feature of my invention.

As is best shown in Figures 1 and 2, the damper rigging consists of damper doors 7—7, one for each supplemental air passage 4—4 and the said doors are slidably mounted between pipes 8—8 that extend through openings 9—9 in the end walls of the furnace and into the bridge wall portion 11—11, the said pipes constituting runners between which the doors 7—7 move as they are shifted to their open and closed position in the manner presently explained.

As is clearly shown in Figures 1 and 2, the runners or guides 8—8 extend some distance beyond the end walls to provide rest portions on which the doors 7—7 are received, when shifted to the open position, as indicated at the left of Figure 2.

Each damper or cut off door 7 is provided with an outwardly extended member 70 and each of the members 70 has a slotway 71 into which is received the lower end of a lever 12 secured at the upper end on a shaft 13 that is journaled in suitable bearing brackets 14—14 attached to and projected from the end walls of the furnace.

The shaft 13, midway its length, has a crank member hereinafter termed the cylinder lever 15, with which joins a vertically reciprocable shaft 16 that connects with the pistons of a pair of hydraulic cylinders 17—17, suitably mounted over the outer face of each end wall and which include the alternately operating intake and outlet pipes 18, which, in practice, are connected up in any well known manner with a fluid supply for actuating the cylinder pistons for shifting the dampers 7—7, at predetermined times, for reversing the furnace.

While I have specifically mentioned hydraulic cylinders for actuating the devices that shift the dampers to the wholly or partly open or closed positions, it is to be understood that the operation of the dampers or doors 4—4 can be done by hydraulic steam, electricity or compressed air with the control of the same absolutely under the furnace operator.

40 designate cooling pipes that enter through the sides of the furnace adjacent the gas tunnels.

From the foregoing description taken in connection with the drawings, the complete arrangement, the manner of using and the advantages of my invention will be readily apparent to those familiar with the operation or use of furnaces of the type referred to.

It is to be understood that while the entire air can be directed through the passages to the gas ports 1—1, yet in case it is desired that a portion of the air go over the top, it is only a matter of opening the dampers at the inlet end to any desired degree, depending upon the amount of air that may be desired for going over the top of the furnace, it being readily apparent by referring to the drawings, that, when the dampers in the supplemental air passages 4—4 are open, the air continues up along the passages over the arched top through which the gas ports pass and are discharged directly under the top of the hearth.

To give the necessary area that may be desired, the dampers at the outgoing end of the furnace are pulled open their entire length, as shown.

By controlling the air and gas supply in the manner stated, it increases the yield of the heat at least two per cent, due to getting the air thoroughly mixed with the gases before heating the metal.

With the dampers, before referred to, arranged as shown and described, it is possible to effectively control the velocity of air and gas entering the furnace and also to burn through one single port, any gas, and at the same time have full area on the outgoing end of the furnace.

Furthermore, in my construction of open hearth furnace, a higher efficiency of the gases is obtained and perfect control in the direction of the gas into the furnace is also provided.

In my improved furnace, it is made possible to work gases that could not, so far as I know, be controlled on the open hearth furnace due to their lightness and lack of control of velocity.

In the working of my construction of furnace, there is no free air going into the furnace except through the passages 1.

The working of any gas burning furnace is improved, since there is no loss of gas in reversing, which is customary on a reverberating furnace.

In my furnace, the gas enters the port and is completely cut off before reversing the furnace.

The flow of gases in my furnace can be changed without stopping the furnace and the cost of repairs is very much less than is usual in other types of like furnaces, due to the perfect control and complete combustion of the gases.

Further, in my construction of furnace, it is possible to work in any combination of liquid fuel or any two gases at the same time.

My improvements may be readily applied to any of the conventional types of furnaces and, in building new furnaces, it would be only necessary to have two regenerators instead of four.

Furthermore, in the practical use of my invention no gases are lost in reversing the furnace and also very little dirt carried down through the regenerators, due to the perfect combustion obtained from the gases.

Another and important advantage in the use of damper controls arranged as shown and described, is, that since it is necessary to be able to concentrate the gas and air through the one port on the incoming end of the furnace, this can be only effectively done by the use of my dampers and valves.

If this were done without the use of valves arranged as in my construction, it would be impossible to get the velocity on the gas and air, which is necessary to get the combustion and effects brought about by the proper manipulation of my damper device.

By having the dampers so that one can open them on the outgoing end of the furnace, by doing so gives the full area of the dampers and the stack, otherwise the draft on the furnace would be checked.

In the use of my special arrangement of valve and damper mechanism, it brings about a great saving, when reversing the valves as no gas passes through the reversing valves whatever.

The advantage of this feature of my invention will be apparent, when it is understood that 15% of the gas required to run the furnace is lost in the reversing of the furnace.

I claim:

1. An open hearth furnace having a hearth, a gas port at each of the opposite ends, an air channel that connects with each gas port, a supplemental air channel at each end that discharges into the top of the furnace, damper controls for opening and closing the said supplemental air channels and means for supplying gas to the gas ports.

2. An open hearth furnace having a hearth, a main air port and a supplemental air port at each end thereof, the main air port being arranged to discharge over the bed or hearth, the supplemental air port being arranged over the closed top of the main air port and to discharge along the top of the furnace, means for supplying gas alternately to the main air ports at either end adjacent their discharges into the furnace, a damper in each of the supplemental air ports, and means for opening and closing said dampers for reversing the direction of the air and gas supply to the furnace.

3. An open hearth furnace having a hearth, a gas port at each of the opposite ends, an air channel that connects with each gas port, supplemental air channels at each end that discharge into the top of the furnace, damper controls for opening and closing the said supplemental air channels and means for supplying gas to the gas ports.

4. In an open hearth furnace in which is included a main air port that discharges onto the hearth, a gas supplying port in connection with the said main air port adjacent the discharge end of the said air port, a pair of supplemental air ports that extend vertically, one at each side of the main air port, and which discharges along the crown of the furnace, a damper in each supplemental air port for opening and closing the said port and means for adjusting the said dampers.

5. In an open hearth furnace in which is included a main air port that discharges onto the hearth, a gas supplying port in connection with the said main air port adjacent the discharge end of the said air port, a pair of supplemental air ports that extend vertically, one at each side of the main air port, and which discharges along the crown of the furnace, a damper in each supplemental air port for opening and closing the said port and means for adjusting the said dampers, said means including a rotative shaft, a lever for each damper attached to the shaft and means for imparting reverse rotation to the shaft for adjusting the said dampers to open and close the port.

6. In a open hearth furnace in which is included a main air port that discharges onto the hearth, a gas supplying port in connection with the said main air port adjacent the discharge end of the said air port, a pair of supplemental air ports that extend vertically, one at each side of the main air port, and which discharges along the crown of the furnace, a damper in each supplemental air port for opening and closing the said port and means for adjusting the said dampers, the said last mentioned means comprising a rigging that consists of a rock shaft, link connections that join the dampers to the shaft and means for rocking the shaft.

7. In an open hearth furnace, in which is included a main air port that discharges onto the hearth, a gas tunnel in communication with the said air port, a gas supply in communication with the tunnel, a supplemental air port that passes adjacent and is adapted for cooling the main air port, a guideway that extends horizontally across the supplemental air port, a damper slidably mounted in the said guideway and adapted for opening and closing the supplemental air port, the said air port being arranged for conveying air over the crown of the furnace for cooling and for intermixing with the air and gas from the main air port, means for slidably actuating the damper, the said means including a rock shaft, a lever arm that connects the shaft and the damper, and means for rocking the shaft, the said means comprising a pair of hydraulic cylinders, a rod connecting the working pistons of the two cylinders, and a connection that joins the said rod and the shaft for rocking the said shaft in reverse directions, as the piston rod is reciprocated at times.

8. In a reversible regenerative furnace, air and gas ports and passages in each end thereof, certain of said air passages joining said gas passages and being closed off from the furnace chamber up to their junction with gas passages, and movable means in association with certain of said ports and passages for concentrating the incoming air into a flow of relatively high velocity at its entrance into the furnace chamber.

9. In a reversible regenerative furnace, air and gas ports and passages in each end thereof, and movable means in association with certain of said ports and passages for concentrating the incoming air into a flow of relatively high velocity, said means upon the outgoing end further serving to permit the diffusion of the outgoing-gases in a flow of relatively low velocity.

10. In a reversible regenerative furnace, ports and passages in each end thereof for the introduction of air and fuel and the egress of exhaust gases, and means for changing the combined area of the ports and passages whereby the exhaust gases from the furnace may be discharged at a lower velocity than that of the incoming air and fuel.

11. In a reversible regenerative furnace, main ports and auxiliary ports in the ends of the furnace, and means associated with the auxiliary ports adapted to control the area available for the passage of gases through said ports whereby the velocity of outflow of the products of combustion through the main and auxiliary ports is rendered different from the velocity of the incoming air and fuel through said ports.

12. In a reversible regenerative furnace, movable means in certain of the furnace ports and passages providing differential control of the velocity of the inflowing mixture of air and fuel through concentrating the flow through a relatively restricted area, and of the velocity of the outflowing products of combustion through selectively determined enlargement of the area through which the gases leave the furnace.

13. In a reversible regenerative furnace, air and fuel ports and passages in each end thereof, certain of said air passages joining said gas passages and being closed off from the furnace chamber up to their junction with gas passages, and movable means in said furnace ends adapted to concentrate the incoming air and fuel into a flow of relatively high velocity at the point of entrance into the furnace chamber.

14. In a reversible regenerative furnace, fuel and air ports at the ends of the furnace chamber, said ports constituting common means for entrance and egress of gases to and from the furnace chamber, and movable means for restricting the effective area of said ports, whereby the fuel and air entering the furnace chamber may be caused to pass through a restricted area of said ports at a relatively high velocity and the products of combustion passing from said chamber may be caused to pass through an enlarged area of said ports at relatively low velocity.

Signed at Hamilton, Ontario, this 26th day of June, 1928.

FRANK B. McKUNE.